(No Model.)
J. E. KAY.
TENONING MACHINE.
No. 539,954. Patented May 28, 1895.
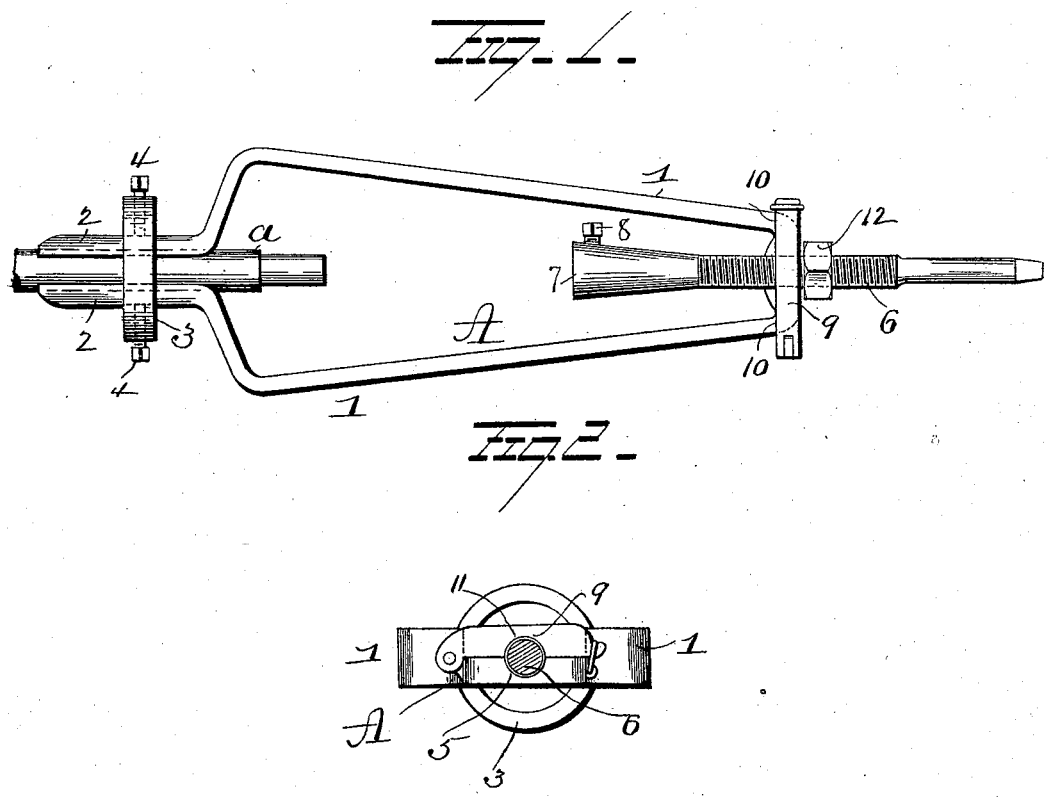

UNITED STATES PATENT OFFICE.

JAMES EARLEY KAY, OF PROVIDENCE, RHODE ISLAND.

TENONING-MACHINE.

SPECIFICATION forming part of Letters Patent No. 539,954, dated May 28, 1895.

Application filed August 3, 1894. Serial No. 519,387. (No model.)

*To all whom it may concern:*

Be it known that I, JAMES EARLEY KAY, a resident of Providence, in the county of Providence and State of Rhode Island, have invented certain new and useful Improvements in Tenoning-Machines; and I do hereby declare the following to be a full, clear, and exact description of the invention, such as will enable others skilled in the art to which it appertains to make and use the same.

My invention relates to an improvement in tenoning machines, the object of the invention being to produce a device by means of which the spoke or other article on which a tenon is to be made can be properly held exactly in line with the cutting tool or hollow auger, and the latter made to accurately cut the spoke or other article to produce the tenon exactly in line with the axis thereof.

A further object is to produce a tenoning device which shall be simple in construction, comprising a small number of parts; one which can be accurately operated by any one with the expenditure of but little exertion and skill, and one which shall be effectual, in all respects, in the performance of its functions.

With these objects in view the invention consists in certain novel features of construction and combinations and arrangements of parts as hereinafter set forth, and pointed out in the claim.

In the accompanying drawings, Figure 1 is a perspective view illustrating my improvements. Fig. 2 is a detail view.

A represents a frame, the general form of which is preferably V-shaped.

The frame A comprises two arms 1, 1, the free ends of which terminate in parallel clamps 2, 2, for the reception of a spoke a, or other device between them, said spoke or other device being thus disposed exactly in line with the opposite end or apex of the frame. A ring 3 encircles the clamping jaws 22 and the spoke held between them, said ring being provided, at diametrically opposite points with screwthreaded perforations for the reception of clamping screws 4, 4 adapted to be made to bear on the jaws 2, 2, and securely clamp the spoke between said jaws. At the apex of the frame A, or, in other words at the junction of the arms 1, 1, composing said frame, a recess 5 is made for the reception of a screw 6, one end of said screw being adapted for the reception of a wrench or other device by means of which to turn it, and the other end of said screw (which projects into the frame) being provided with a head or chuck 7 adapted to receive a suitable hollow auger which will be held in place in the head or chuck by means of a set screw 8, the cutter or hollow auger held by the head or chuck 7 being thus disposed exactly in line with the axis of the spoke a. An arm 9 is hinged at one end to one of the arms of the frame A at the apex thereof and extends over the screw 6, said arm being adapted to enter a recess 10 in the frame A and between its ends said arm is made with a screwthreaded recess 11, the screwthreads in said recess being adapted, when the arm is in its working position, to mesh with the threads of the screw 6, a link 14 being pivoted in position to hook over the free end of the arm 9 to hold the latter clamped in position around the screw.

From this construction and arrangement of parts it will be seen that when the arm 9 is in its working position and the screw 6 is turned, the cutting tool or hollow auger will be fed forward to cut the tenon on the spoke, or said tool will be moved away from the spoke, according to the direction in which the screw is turned. By raising the arm 9, the screw 6 and the tool carried thereby can be freely moved in either direction to properly set the tool relatively to the spoke. A nut 12 is preferably placed on the screw 6 and serves as a gage whereby to regulate the desired length of the tenon.

My improvements are very simple in construction, cheap to manufacture, easy and accurate in operation, and effectual, in all respects, in the performance of its functions.

Slight changes might be made in the details of construction of my invention without departing from the spirit thereof or limiting its scope and hence I do not with to limit myself to the precise details of construction herein set forth, but, Having fully described my invention, what I claim as new, and desire to secure by Letters Patent, is—

The combination with a frame comprising a single piece of metal bent to form two members which terminate at their ends in a pair of elongated clamping jaws adapted to receive the spoke or other article to be operated upon between them, a movable ring surrounding these clamps and means connected with the ring for closing the jaws upon the article being operated upon, of a movable arm adapted to cooperate with a part of the frame to form a threaded recess or socket, a screw operating in the recess or socket, a chuck carried by this screw, and a gage adjustably connected with the screw to regulate and define the length of tenon to be cut, substantially as set forth.

In testimony whereof I have signed this specification in the presence of two subscribing witnesses.

JAMES EARLEY KAY.

Witnesses:
WILLIAM I. ROGERS,
FRANK. B. KAY.